Figure 1:
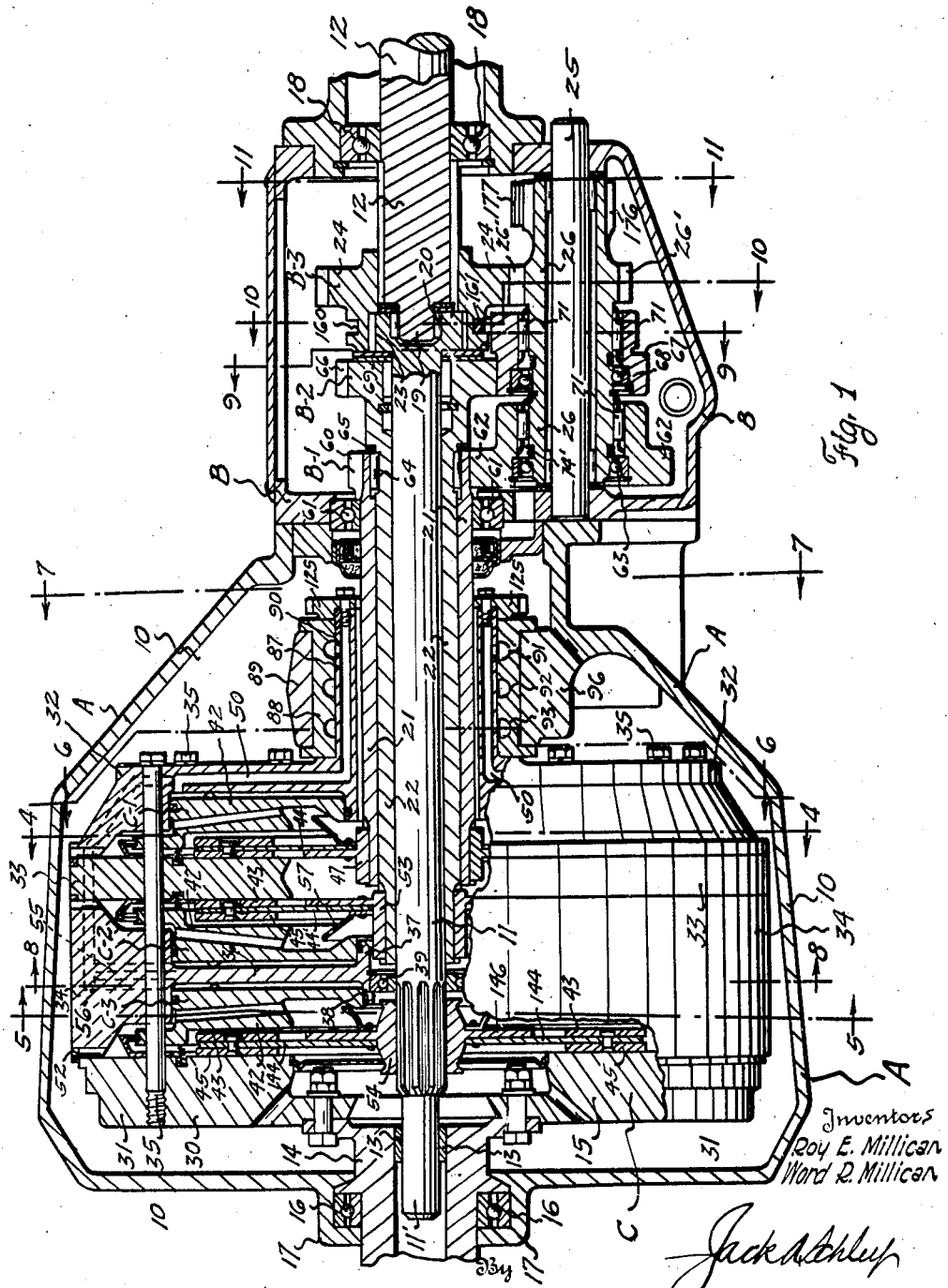

May 28, 1935.  R. E. MILLICAN ET AL  2,003,212

POWER TRANSMISSION

Filed Aug. 11, 1934  9 Sheets-Sheet 5

Inventors
Roy E. Millican
Word R. Millican

By Jack Ashley

Attorney

May 28, 1935.  R. E. MILLICAN ET AL  2,003,212

POWER TRANSMISSION

Filed Aug. 11, 1934    9 Sheets-Sheet 6

Inventors
Roy E. Millican
Word R. Millican

By Jack Ashley
Attorney

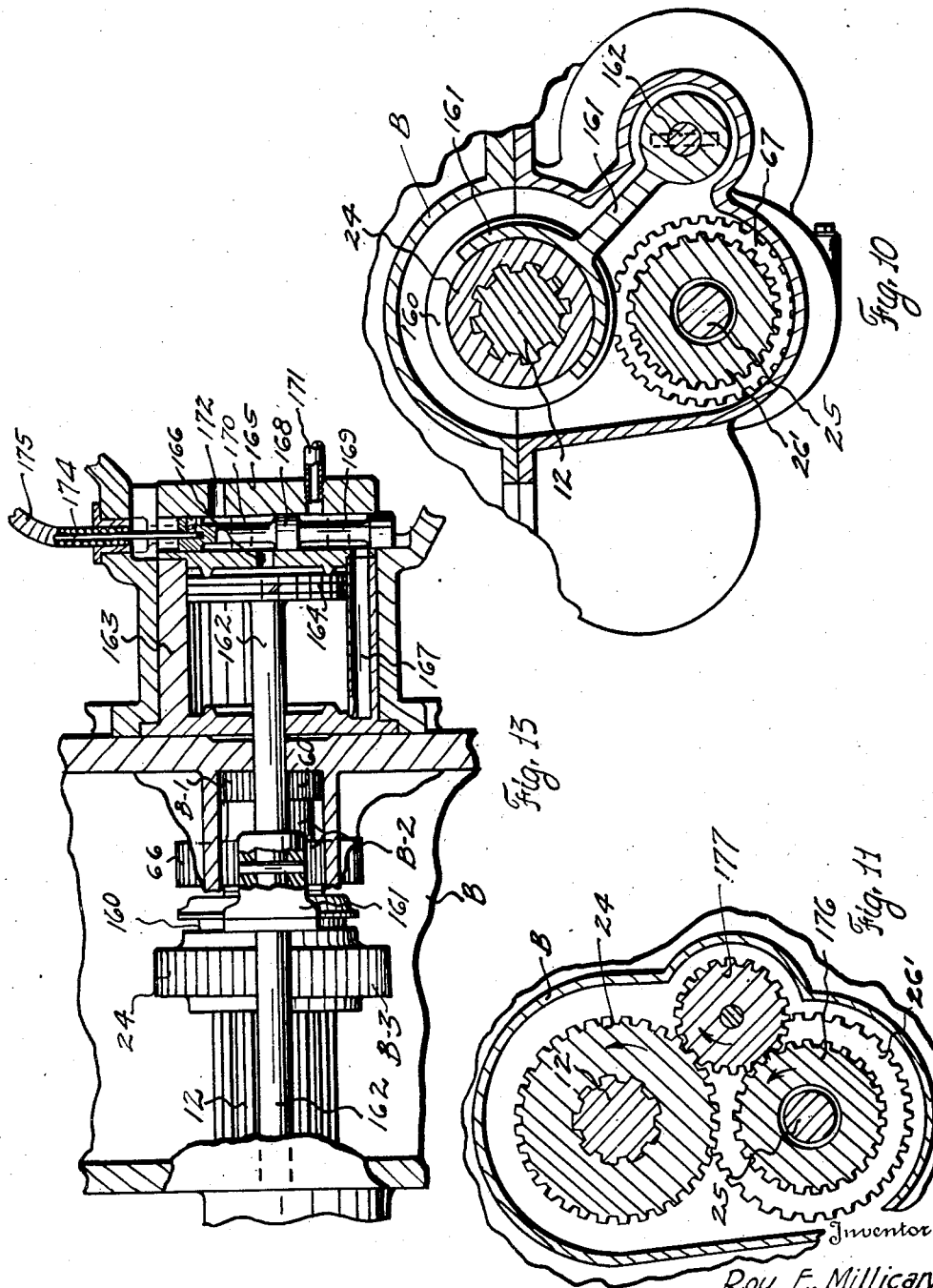

May 28, 1935.  R. E. MILLICAN ET AL  2,003,212
POWER TRANSMISSION
Filed Aug. 11, 1934  9 Sheets-Sheet 8

Inventors
Roy E. Millican
Word R. Millican
By Jack A. Athley
Attorney

May 28, 1935.  R. E. MILLICAN ET AL  2,003,212

POWER TRANSMISSION

Filed Aug. 11, 1934  9 Sheets-Sheet 9

Inventors
Roy E. Millican
Word R. Millican

By Jack Athley
Attorney

Patented May 28, 1935

2,003,212

UNITED STATES PATENT OFFICE 2,003,212

POWER TRANSMISSION

Roy E. Millican, Dallas, Tex., and Word R. Millican, Parsons, Kans.

Application August 11, 1934, Serial No. 739,380

19 Claims. (Cl. 74—336.5)

This invention relates to new and useful improvements in power transmissions.

The invention has to do with the methods of transmission of power, as well as the means for transmitting power, and involves the automatic gradation of the transmission of the power to the load, whereby proportionate ratios are set up and the driving force is uniformly applied under varying loads and speeds and also whereby variations in the R. P. M. of the power and driving shafts are co-ordinated, all without decelerating the motor.

A particular object of the invention is to automatically control the selection of fixed gear ratios by means of clutches, whereby constant meshing gears may be employed and the necessary transmission ratios provided by slippage in the clutches.

Another object of the invention is to provide a transmission including a plurality of clutches, each arranged to control the transmission of motion from the engine or prime mover to the driven shaft at a predetermined transmission ratio or drive, together with means controlled by variations in the speed R. P. M. of the drive shaft, for automatically actuating and selecting the proper clutch to set up the transmission ratio or drive, proper for the load imposed upon the driven shaft.

Another object of the invention is to provide a transmission involving a plurality of clutches, individually connected with transmission gears of different ratios; and speed controlled means for automatically actuating hydraulic means for individually operating the clutches.

A further object of the invention is to provide a transmission which, while substantially automatic in operation, may be manually controlled.

Still another object of the invention is to provide a transmission so arranged as to prevent racing of the motor or prime mover when the device is shifted to gear ratios which are too low; and also to eliminate stalling of the motor when the device is shifted to gear ratios which are too high, all based upon the load on the driven shaft.

A further object of the invention is to provide a plurality of gear trains, each setting up a different gear ratio, and arranged to remain in constant mesh, so that each may be operated independently of the other, whereby a shift may be made from a low to a high gear ratio or vice versa without the necessity of unmeshing said gear trains.

A construction designed to carry out the invention will be hereinafter described, together with other features of the invention.

Figure 2:
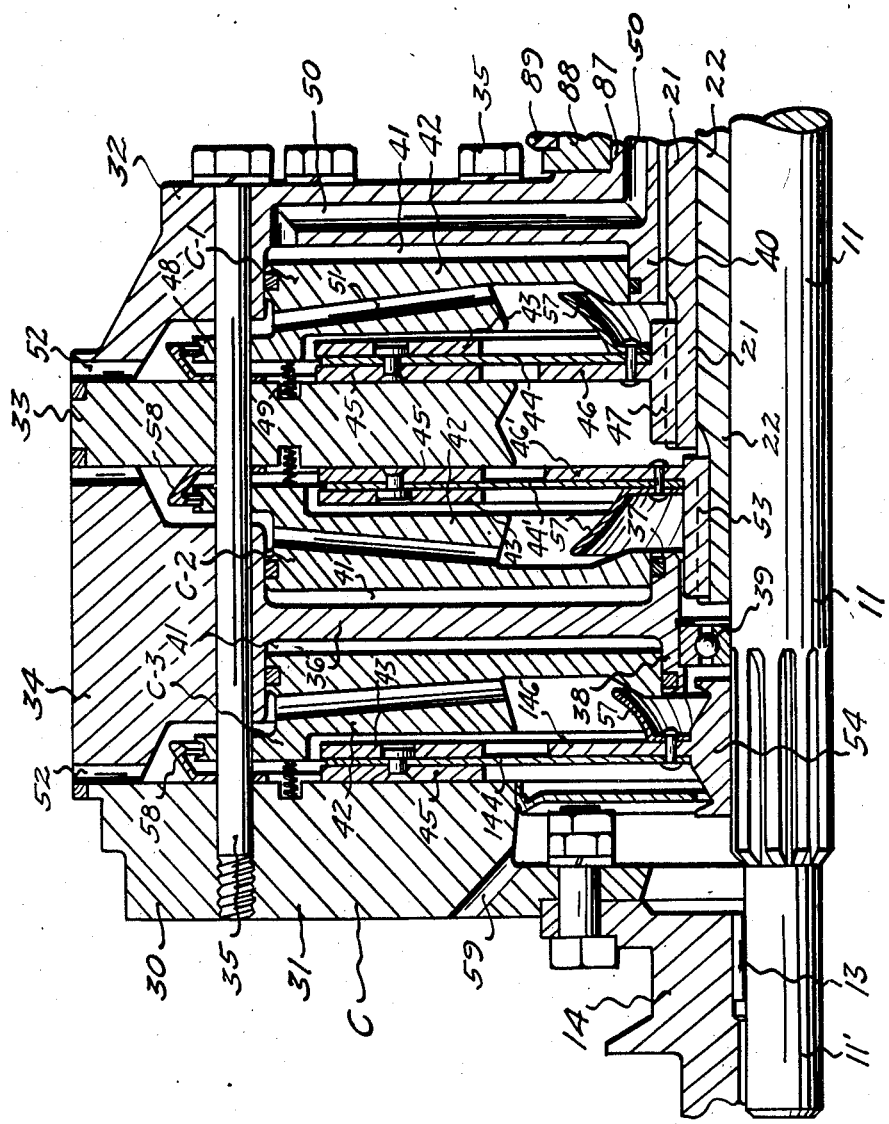
Figure 3:
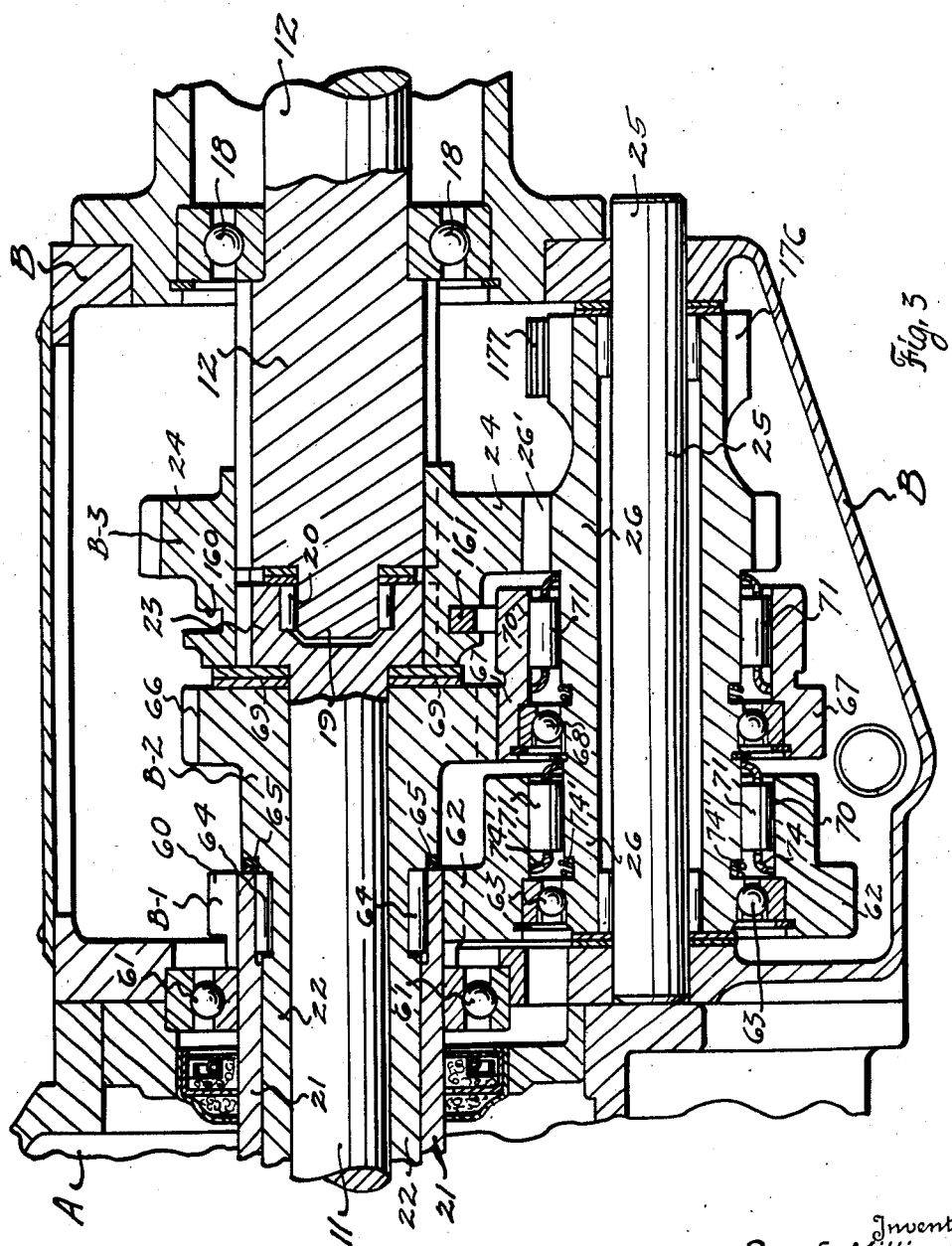
Figure 4:
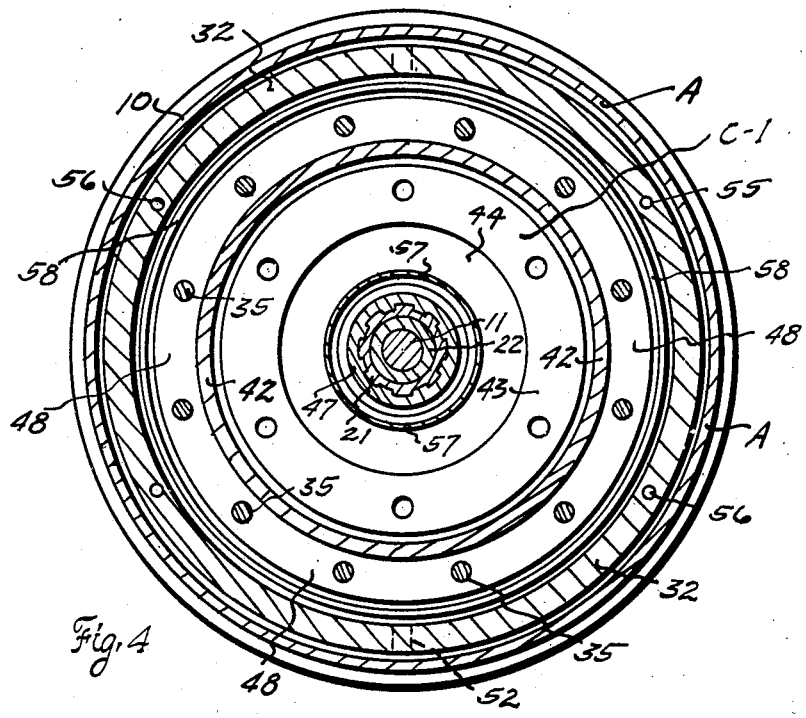
Figure 5:
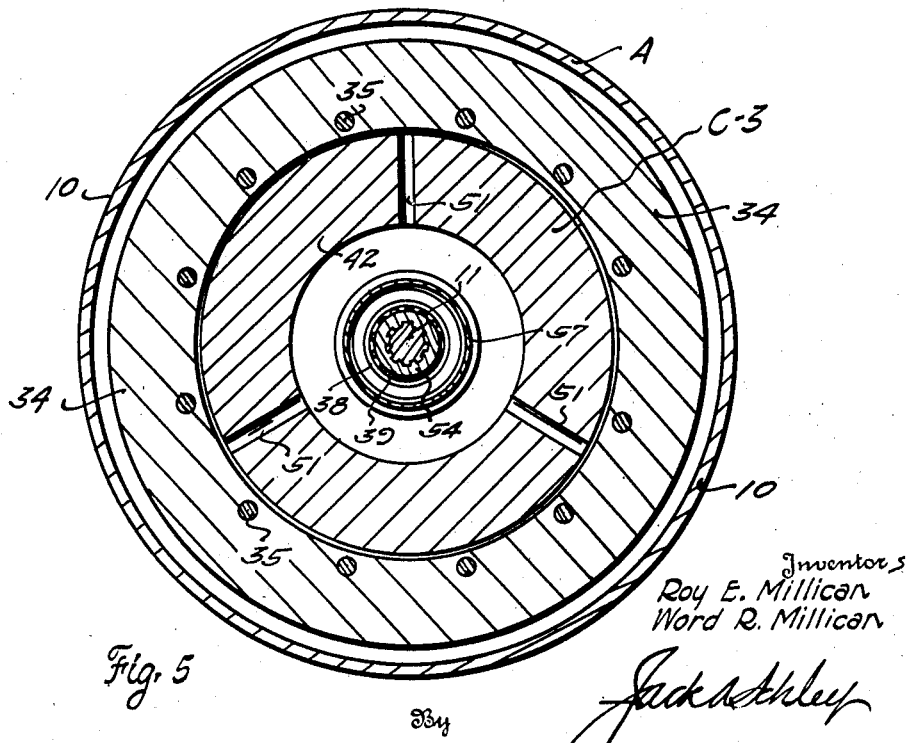
Figure 6:
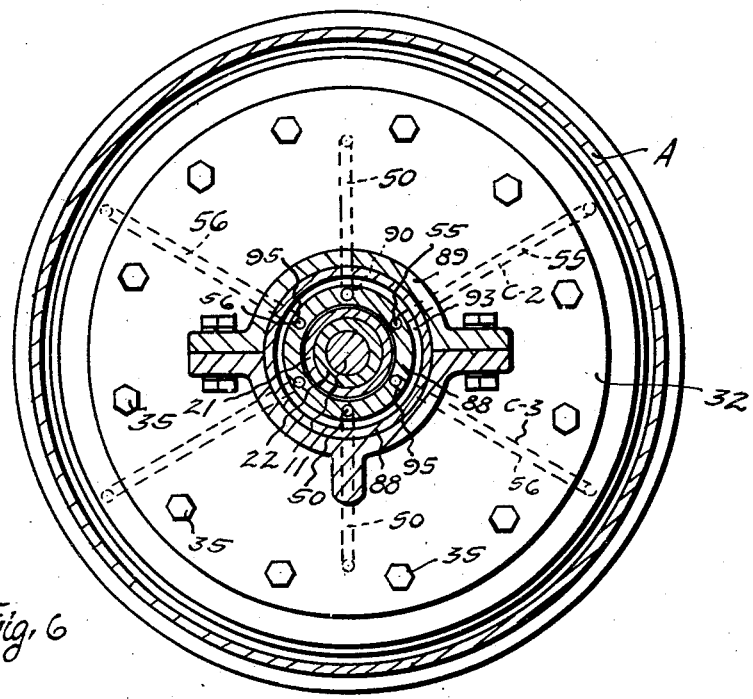
Figure 7:
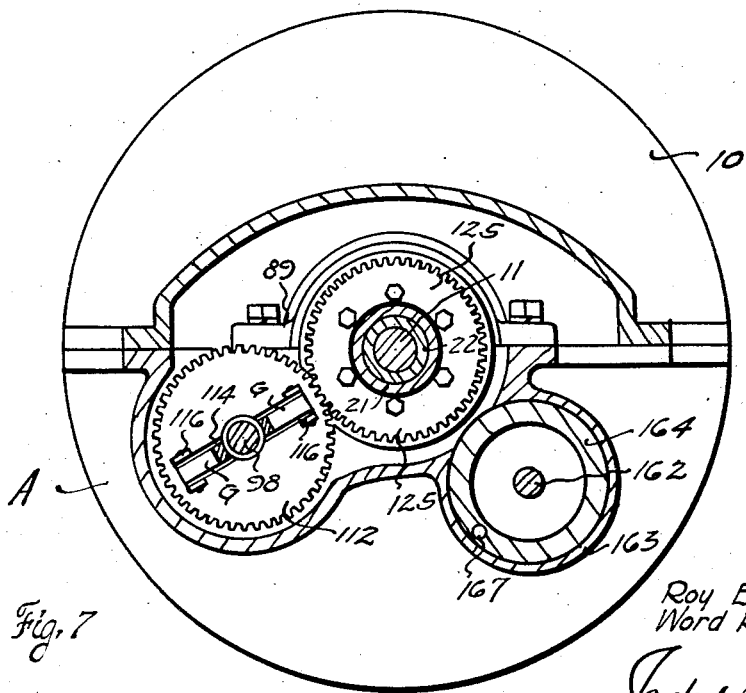
Figure 8:
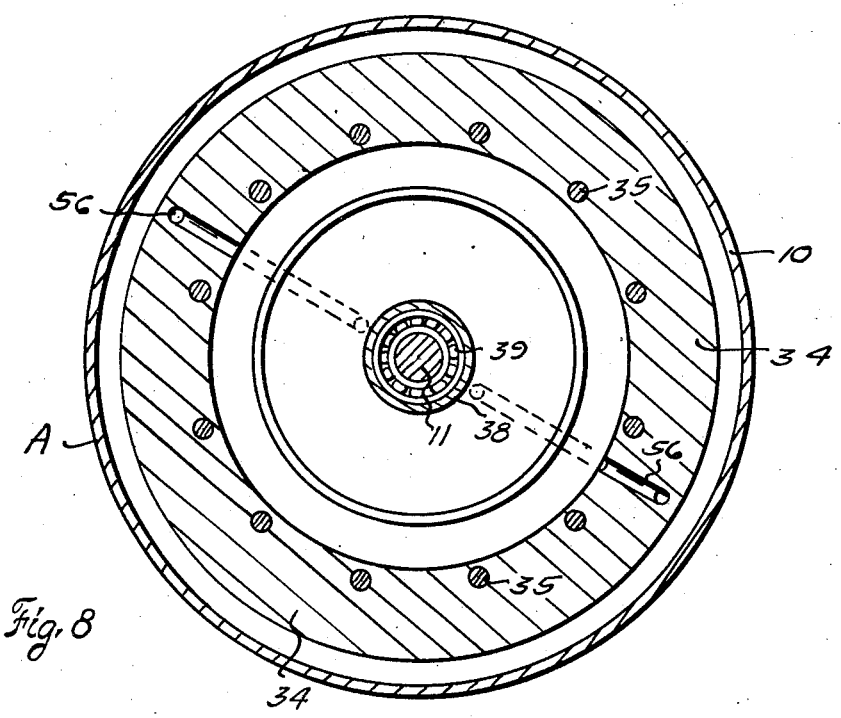
Figure 9:
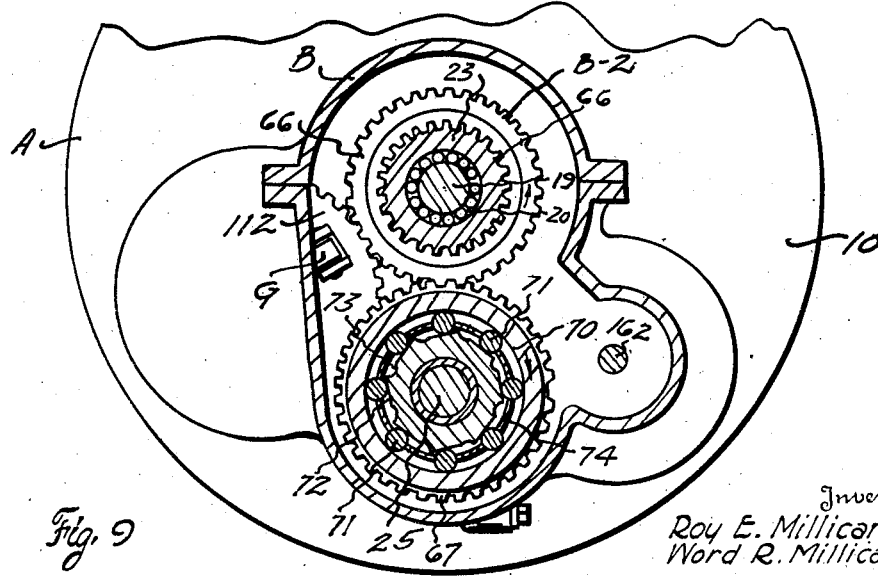
Figure 12:
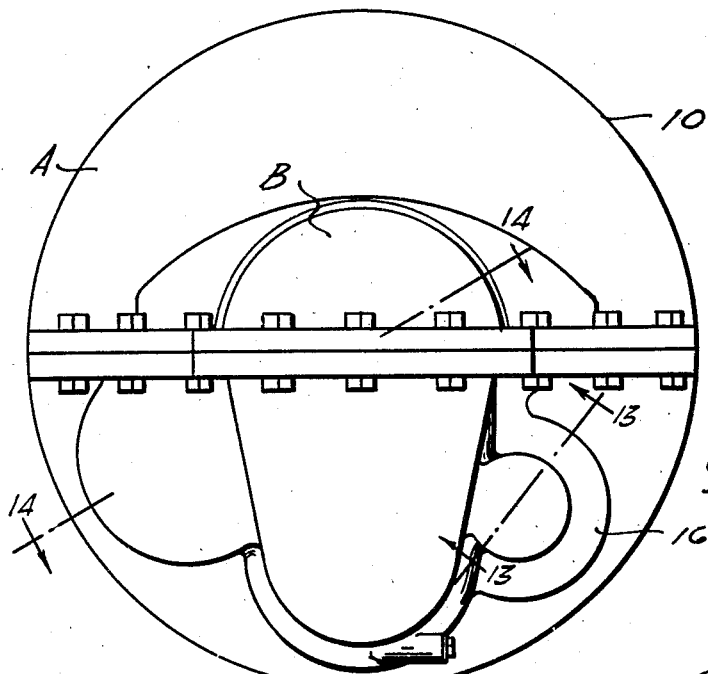
Figure 16:
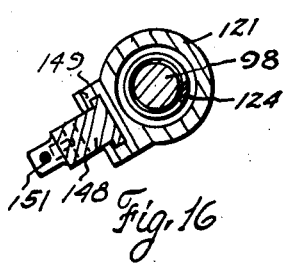
Figure 15:
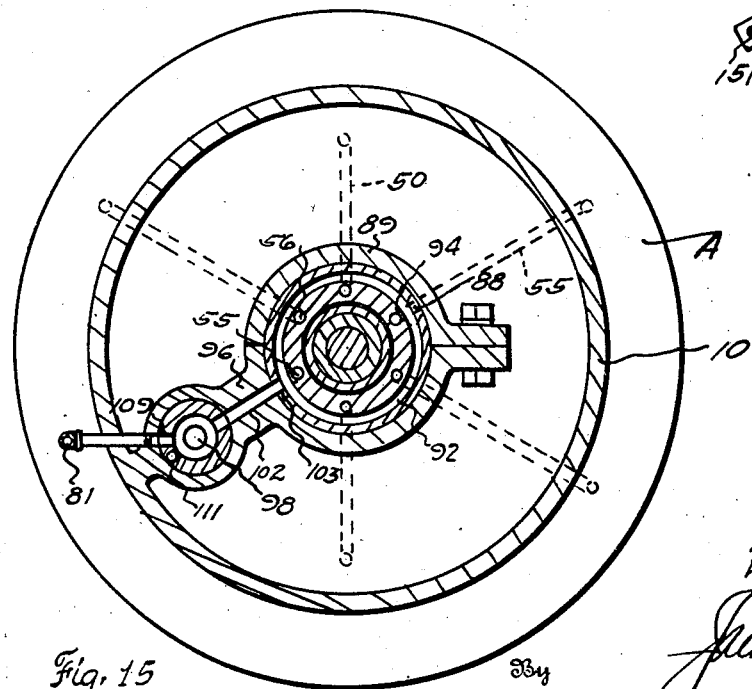
Figure 14:
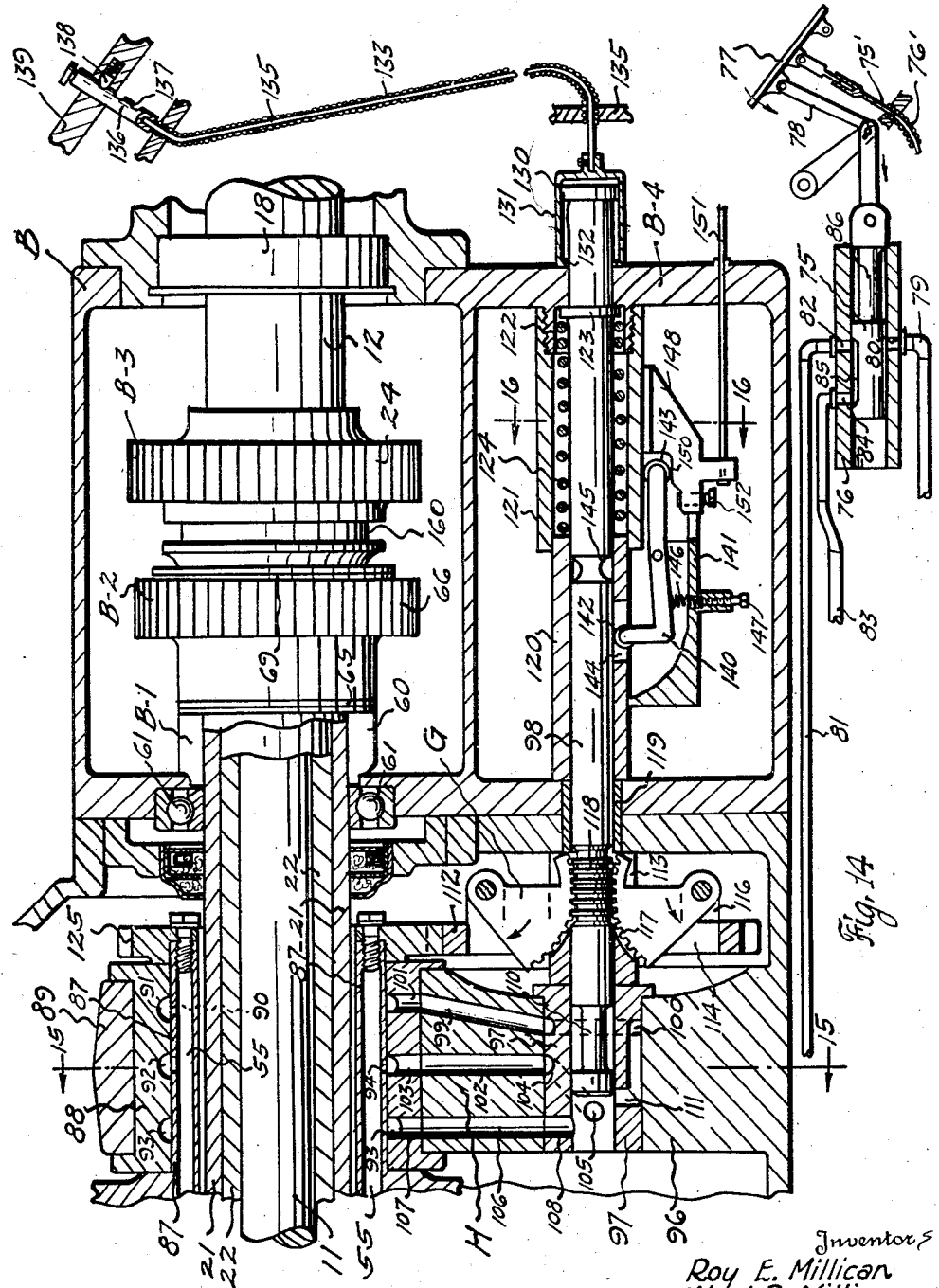

The invention will be more readily understood from a reading of the following specifications and by reference to the accompanying drawings, in which an example of the invention is shown, and wherein:

Figure 1 is a longitudinal vertical sectional view of a transmission constructed in accordance with the invention and showing the parts in their normal or starting position, Figure 2 is an enlarged longitudinal sectional view of a portion of the clutches, Figure 3 is a longitudinal vertical sectional view of the transmission gears, Figure 4 is a tranverse vertical sectional view taken on the line 4—4 of Figure 1, Figure 5 is a transverse vertical sectional view taken on the line 5—5 of Figure 1, Figure 6 is a transverse vertical sectional view taken on the line 6—6 of Figure 1, Figure 7 is a transverse vertical sectional view taken on the line 7—7 of Figure 1, Figure 8 is a transverse vertical sectional view taken on the line 8—8 of Figure 1, Figure 9 is a transverse vertical sectional view taken on the line 9—9 of Figure 1, Figure 10 is a transverse vertical sectional view taken on the line 10—10 of Figure 1, Figure 11 is a transverse vertical sectional view taken on the line 11—11 of Figure 1, Figure 12 is an end elevation of the transmission shown in Figure 1, Figure 13 is a longitudinal cross-sectional view taken on the line 13—13 of Figure 12, Figure 14 is a longitudinal cross-sectional view taken on the line 14—14 of Figure 12, Figure 15 is a transverse vertical sectional view taken on the line 15—15 of Figure 14, and Figure 16 is a transverse vertical sectional view taken on the line 16—16 of Figure 14.

General assembly

In the drawings the numeral 10 designates a case which is divided into a forward or front section A and a rear section B. The section A may have its forward portion shaped in any suitable manner, and arranged to be attached to the rear of an internal combustion engine or other motor to which a transmission is usually attached, and the invention is not to be limited to any particular structure.

A drive shaft 11 extends longitudinally through the section A into the section B and is axially alined with a driven or tail shaft 12. The forward end of the drive shaft is reduced at 11' and is mounted in roller bearings 13 in the hub 14 of the housing 15 of the clutch assembly C. The hub 14 is rotatably mounted in bearings 16 carried by the box 17 of the case 10.

The driven shaft 12 is mounted in bearings 18 at the rear of the section B. The forward end of the driven shaft has a trunnion 19 engaging in roller bearings 20 inserted in the rear end of the drive shaft 11 as is shown in Figures 1 and 3. By this arrangement the drive shaft and the driven shaft are free to undergo independent rotation.

Within the housing C are shown three clutches C—1, C—2, and C—3 (Figures 1 and 2). Sleeves 21 and 22, as is best shown in Figures 1, 2 and 3, surround the shaft 11. The sleeve 22 is mounted to rotate on the drive shaft 11 and within the sleeve 21. The clutch assembly C—1 connects with the sleeve 21, while the clutch assembly C—2 connects with the sleeve 22. The clutch C—3 connects with the drive shaft 11.

The sleeve 21 is connected with a gear train or assembly B—1 while the sleeve 22 is connected with a gear train or assembly B—2. A clutch head 23 (Figures 1, 3 and 9) made integral with the rear end of the drive shaft 11 telescopes the hub of a sliding gear 24 splined on the driven shaft 12 and this constitutes a gear train or assembly B—3.

A counter shaft 25 is secured longitudinally in the lower portion of the section B of the case 10. A counter sleeve 26 is rotatably confined on this shaft as is shown in detail in Figure 3. Elements of the gear trains or assemblies are mounted on this sleeve so as to be individually operated.

From the foregoing it will be seen that when the clutch assembly C—1 is operated, the gear assembly B—1 will be operated through the agency of the sleeve 21. When the device is being used the gear 24 of the assembly B—3 will be constantly connected with the sleeve 26 by means of a pinion 26' integral with said sleeve, consequently the driven shaft 12 will be operated when any of the clutches are operated. The operation of the clutch C—3 will effect a direct drive from the shaft 11 to the shaft 12. The details of these parts will be hereinafter pointed out. These various clutching connections will produce predetermined fixed gear ratios. There will be a certain amount of slippage in each clutch and thereby intermediate transmission ratios will be set up; and in this manner transmission ratios proper for the load imposed will thus be obtained.

One of the important features is a governor G shown in Figure 14. This governor controls a hydraulic unit H, whereby the flow of a fluid, such as oil, under pressure to each clutch is governed. By this means the speed of the engine causes an operation of the governor, whereby a particular clutch is selected and the proper transmission ratio set up.

*The clutch assembly*

The hub 14 of the clutch assembly is connected to the crank shaft of the engine or motor, or is otherwise connected to be driven by the prime mover. The assembly includes a housing 30 as is best shown in Figures 1, 2 and 4 to 8, inclusive. The housing 30 includes a front member or disk 31, a rear member or cap 32, a spacing ring 33 and a collar member 34. These clutch members are tied together by transverse bolts 35 so as to rotate as a unit.

The collar 34 has a reduced internal annular web 36 supporting collars 37 and 38. A ball bearing member 39 mounted in the collar 38 supports the drive shaft 11 and co-acts with the roller bearings 13 in the hub 14. The cap 32 is provided with an internal collar 40 surrounding the sleeve 21. This collar co-acts to form an annular chamber 41 formed in the cap for receiving a piston disk 42 which is slidable longitudinally in the clutch housing. The piston, as is shown in Figures 1, 2 and 4, is recessed to receive a clutch ring 43 carried on one side of a spider 44. On the other side of the spider a clutch ring 45 is provided and arranged to frictionally engage one side of the spacing ring 33.

When the piston 42 is displaced toward the ring 33 it engages the clutch ring 43 and forces the ring 45 into frictional engagement with the ring 33. There will be a certain amount of slippage between the piston and the ring 43, as well as between the ring 45 and the ring 33, before the clutch relation is fully established. This will permit a variation in transmission ratios. The spider 44 is fastened to an annular flange 46 extending from the collar 47 which is splined on the end of the sleeve 21; thus when clutch relation is established rotation is imparted from the clutch housing 30 to the sleeve 21. This operation connects the clutch C—1 with the transmission gear assembly B—1. The piston 42 has a marginal flange 48 through which the bolts 35 pass, whereby the piston is held against rotation, independently of the housing, but is free to slide as has been described. Coiled springs 49 carried by the ring 33 engage the piston so as to displace the same from the clutch ring when the fluid pressure is relieved as hereinafter described.

When the piston 42 is displaced the clutch rings 43 and 45 are clamped between said piston and the housing ring 33 and are thus caused to rotate with said housing. The spider 44 being connected with the collar 47 which is fastened on the sleeve 21 transmits motion to said sleeve. While the clutch might be operated in various ways, we prefer to operate the piston hydraulically. The hydraulic fluid is supplied from the control assembly H, which will later be described in detail to radial ducts 50 in the cap 32 as is shown in Figures 1, 2 and 6. These ducts discharge into the chamber 41. By using a hydraulic fluid, such as light weight lubricating oil, the pressure exerted on the piston may be controlled; and the clutch gradually applied so as to provide slippage or quickly applied, according to the pressure exerted, to make for varying transmission ratios, according to the speed and load requirements and conditions. The piston is provided with a plurality of ducts 51 forming by-passes for any fluid which may be trapped within the piston. Bleeder ports 52 provide escape for the fluid from the housing into the section A of the case 10.

The clutches C—2 and C—3 are very similar, and are substantially the same as the clutch C—1, except as to certain minor details and, where the parts are substantially the same, the same reference numerals will be used. The chambers 41 are formed on opposite sides of the web 36 and a piston 42 is mounted in each of these chambers. One of the pistons is adapted to slide on the collar 38. A spider 44' forming a part of the clutch C—2 is attached to the flange 46' extending from a collar 53 splined on the end of the sleeve 22. This clutch is otherwise like clutch C—1 and co-acts with the opposite side of the spacer ring 33.

The clutch C—3 includes a spider 144 fastened to a flange 146 extending from a collar 54 splined on the drive shaft 11. The remaining parts of the clutch C—3 are substantially the same as the other clutches. The clutch ring 45 of the clutch C—3 engages the disk 31 when in clutching position. The clutch rings 43 and 45 may be of the usual material used for friction clutches.

For supplying a hydraulic fluid to the clutches C—2 and C—3, ducts 55 and 56 are provided. These ducts lead radially in the cap 32 and then transversely through the cap, the ring 33 and into the collar 34, as is shown in Figures 1, 2 and 8. The ducts then extend inwardly in the collar 34, the ducts 55 being connected to the chamber 41 of the clutch C—2 and the ducts 56 being connected to the chamber 41 of the clutch C—3. The ducts 50, 55 and 56 are disposed in diametrically opposite relation as is shown in dotted lines in Figure 6, so as to deliver the pressure fluid at opposite points in each chamber 41. It is desirable to keep the pressure fluid, especially oil, away from the clutch rings 43 and 45 and therefore annular splash guards 57 are fastened to the spiders 44 and 44' and also the flange 146. These guards act to prevent the fluids from being thrown outwardly by the centrifugal action. Annular guards 58 are mounted so as to overhang the flanges 48 as is best shown in Figure 2. These guards prevent the fluid from working inwardly between the clutch rings and their co-acting faces. One or more bleeder ports 59 are made in the disk 31 to provide an escape for the pressure fluid.

The gear assembly

A pinion 60 is preferably made integral with the rear end of the sleeve 21 which sleeve is supported in a ball bearing 61 at the front end of the case section B. A counter gear 62 is mounted on a ball bearing member 63 carried by the sleeve 26. The end of the sleeve 21 is supported on roller bearings 64 seated in the sleeve 22, which carries end thrust washers 65 for receiving the sleeve 21.

A gear 66 is made integral with the rear end of the sleeve 22 and meshes with a counter pinion 67 mounted on a ball bearing member 68 carried by the sleeve 26 as is best shown in Figure 3. End thrust washers 69 surrounding the shaft 11 are interposed between the end of the sleeve 22 and the clutch-head 23, (Figures 1 and 3).

In order that the gear 62 and the pinion 67 may overrun, thus permitting each to operate independently of the other, each of these elements is provided with an annular interior race 70 as is shown in Figures 1, 3 and 9. Rollers 71 are arranged to travel in this race. The sleeve 26 is provided with inclined faces 72 having sumps 73 at their lower ends. The rollers are held apart or spaced by an annular spacer 74 which is attached to one end of a spring 74' coiled about the sleeve 26 and having its end secured thereto. These springs act to urge the spacers in a clockwise direction (Figure 9) thus influencing the rollers to ride up the inclined faces 72 and impart rotation to the sleeve.

The hydraulic system

For supplying the oil, or other hydraulic fluid to the control H, a slide valve 75, as is shown in Figure 14, or other means, is provided. This valve operates in a case 76, which may be suitably mounted on the vehicle. The valve may be operated in any suitable manner. I have shown a foot pedal 77 connected to the valve, by a linkage 78. A feed pipe 79 extends from the oil pump to a port 80 in the case. A supply pipe 81 leads from port 82 in the case, opposite the port 80. The pipe 81 is connected through the case 10 to the control H, as is shown in Figure 15. A return line 83 leads from port 84 in the valve case 76, to the pump. The valve 75 has a duct 85, which when the valve is in its normal position, connects the ports 82 and 84, which permits the oil to flow back to the pump, but whereby the supply of oil from the port 80 is cut off. The valve has a reduced portion 86, and by depressing the pedal 77 this reduced portion is moved between the ports 80 and 82, whereby oil is supplied from the pipe 79 to the pipe 81. The foot pedal may also be connected to the carburetor valve through a wire 75' slidable through a flexible conduit 76'. The connection between the wire 75' and pedal is such that the pedal moves a sufficient distance to move the valve 75 to admit fluid to the control H before the wire 75' is moved to open the carburetor valve to speed up the motor. Thus, it is obvious that fluid must be admitted to the control before the engine speed is increased.

The cap 32 of the housing 30, has a cylindrical hub 87 which is mounted to revolve on the sleeve 21 as is shown in Figures 1, 6, 14 and 15. The hub is mounted to rotate in a bushing 88 which is mounted in a bearing member 89 in the rear of the section A of the case. The bushing is provided with annular grooves 91, 92 and 93. The groove 91 communicates through ports 90 with the ducts 50 of the cap 32 which extends into the hub of the housing. The groove 92 connects with the ducts 55 by ports 94 as is shown in Figure 15, while the groove 93 connects with the ducts 56 by ports 95 (Figure 6).

The bearing member 89 is made integral with a transverse web 96 which in turn is made integral with the lower portion of the section A of the crank case, as is shown in Figures 14 and 15. A bushing 97 is mounted in the web 96 and supports the forward end of a piston valve 98. As is best shown in Figure 14, a duct 99 extends from an annular groove 100 surrounding the bushing, to a port 101 in the bushing 88, which connects with the groove 91. A duct 102 extends through the web 96 and connects at one end with a port 103, connected with the groove 92 and at its other end with a groove 104, on the outside of the bushing 97 connected with a port 105. A duct 106 connects at one end with a port 107 connecting with the groove 93 while at its opposite end, the duct connects with a port 108 in the bushing 97. The pipe 81 connects with the interior of the bushing 97 through a port 109.

The piston valve 98 has a reduced portion 110 within the bore of the bushing 97. When the parts are in their normal positions, as is shown in Figures 1 and 14, the reduced portion 110 of the valve establishes communication with the inlet port 109 but communication with the other ports of the bushing is cut off. A duct 111 extends from the bushing bore to the groove 100, but is closed to the port 109 by the valve 98.

A gear 112 is provided with a hub 113, which is journaled on the valve 98, between the bushing 97 and the rear end wall of the section A of the case 10. Radial slots 114 are provided in the gear and its hub, to receive segmental governors which have been referred to before as the governors G. These governors are pivoted between ears 116 and are provided with gear teeth 117 engaging annular teeth 118 on the valve 98. It is obvious that when the gear 112 is revolved, the governors will be swung in the direction of the arrows, (Figure 14) whereby the valve 98 will be slid forwardly into the bushing 97.

The valve is supported in a liner (Figure 14) 119 mounted in the contacting walls of the sections A and B. Within the section B the valve 98 is slidable in a sleeve 120 having its rear end secured in the forward end of a cylindrical housing 121, which is screwed at its rear end onto an annular collar 122 projecting inwardly from the rear wall of the section B. A collar 123 fastened on the valve 98, impinges the rear wall B—4 of the case, thus forming a stop and limiting the rearward movement of the valve. A coiled spring 124 confined in the housing 121, between the end of the sleeve 120 and the collar 123 acts to return the valve to its normal position, and this spring is placed under tension when the governors are swung outwardly.

When the engine or prime mover (not shown) is started, the hub 14 of the housing 30 will be revolved, and said housing thus also revolved. A pinion 125 fastened on the rear end of the hub 87 of the housing meshes with the gear 112, thus revolving the latter. When this gear is revolved, the governors G will be displaced, thereby sliding the valve 98 forwardly into the bushing 97, and placing the spring 124 under tension. However, it is pointed out that the normal tension of the spring is such that the idling speed of the motor will have no effect upon the governors and therefore, when the engine, or other prime mover, is idling the governors are in their retracted positions, as shown in Figure 14 and no fluid is being admitted to the clutches. As soon as the speed of the engine is increased above idling, the governors swing outwardly and the valve 98 is slid forwardly. The reduced portion 110 of said valve will establish communication between the port 109 and the duct 111, but no oil will flow from the pipe 81 through the port 109, until the foot pedal 77 is pressed to slide the valve 75 forwardly and bring the reduced portion 86 between the ports 80 and 82. Since the pedal 77 not only controls the valve 75 to admit oil to the control H, but also controls the acceleration of the engine, as has been explained, it is obvious that the valve 75 is always opened before the engine is accelerated above an idling speed. This provides a positive admission of the oil when acceleration of the engine takes place. When the valve 75 is slid forwardly, oil under pressure will be discharged from the port 109 and conveyed by the duct 111 to the groove 100. This oil will flow from the groove 100 by way of the duct 99, port 101, to the groove 91, in the bushing 88. From the groove 91 the oil will flow through the ports 90 to the duct 55, and then to the chamber 41 of the clutch C—1, which will thus be operated. This will drive the low gear B—1, whereby motion will be transmitted by way of the sleeve 26 to the pinion 24 on the driven shaft 12.

As the speed of the motor increases, the governors G will be further extended, and the valve 98 will thus be supplied through the groove 104, and then by way of the duct 102 to the port 103, to the groove 92. From the groove 92, the oil will flow through the ports 94 to the ducts 55, and then to the chamber 41 of the clutch C—2. The clutch C—2 will transmit motion to the sleeve 22 and the gear train B—2, whereby the sleeve 26 will be revolved at a higher rate of speed, than by the gear train B—1. The overrunning mounting of the gear 62 and the pinion 67 will permit these speed variations. The pinion 24 and the shaft 12 will thus be driven at a higher rate of speed. It will be noted that the port 105 and the entrance to the duct 111 are so related that a portion of the port is uncovered before the duct is fully uncovered, this permits a reduced quantity of oil to flow to the clutch C—2, before the full supply of oil is conveyed to the clutch C—1. The full pressure will not be exerted until the full supply of oil is delivered to the clutch. This coupled with the slippage, between the clutch members, will provide for intermediate transmission ratios between the two fixed gear ratios, provided by the gear trains B—1 and B—2.

When the motor reaches what is termed high speed, the port 108 is uncovered, and the oil flows through the duct 106 to the port 107 and then to the groove 93, which is connected with the ducts 56 by the port 95. The oil flowing into the ducts 56 is delivered to the chamber 41 of the clutch C—3, whereby said clutch is actuated. The clutch C—3 is connected directly to the shaft 11, and this shaft through the heads 23 and gear 24, drives the driven shaft 12. In this manner, motion is transmitted directly from the drive shaft 11 to the driven shaft 12, intermediate transmission ratios being provided by clutch slippage. It is pointed out that the reduced portion 86 of the sliding valve 75 is of sufficient length to remain between the ports 80 and 82 while the pedal 77 is being depressed to accelerate the engine to high speed. In other words, this reduced portion moves between the ports when the pedal is first depressed and remains so during the remainder of the downward movement of said pedal.

Manual control

It may be desirable under some conditions to manually operate the piston valve 98. For instance in climbing a hill, or a steep grade, the clutches will be automatically operated to provide the proper transmission ratio for the increased load, but upon reaching the top of the hill and starting downward, the speed of the motor would immediately be increased and there might be a tendency to race the motor. Also some drivers descend hills in second and low gears. Means have been provided whereby the valve 98 may be operated to shift it from a higher to a lower gear ratio and maintain it at such a point if the operator for any reason desires to operate the engine in a lower gear. An annular head 130 is provided on the rear end of the piston valve and telescopes a cylindrical cap 131. The cap has an internal annular flange 132 (Figure 14) at its forward end in the path of the head 130. A flexible conduit 133 is fastened in a bracket 134 adjacent the cap and encloses a wire 135 which is fastened at one end to the cap, and at its opposite to a plunger 136. The plunger is provided with a plurality of notches 137 adapted to receive a spring dog 138 mounted in a support 139. The spring dog 138 is normally engaged in the uppermost notch 137. When the piston valve 98 is advanced by the governors G, to operate the clutches, the head 130 is carried forwardly; and when said valve is advanced to operate the clutch C—3, the head 130 will be in close proximity to the flange 132. By pulling the plunger 136 so that the dog 138 engages in the next notch 137, the valve will be retracted, whereby the clutch C—3 will be released, and the clutch C—2 will be set in operation. If the plunger should be moved until the third notch 137 is engaged by the dog 138 then the valve 98 will be pulled back so as to operate the clutch C—1. By this arrangement, the operation of the clutches may be manually controlled in a reverse order and a selected gear ratio maintained even at a high motor speed.

High speed lock

Under certain load conditions, as for instance for slow driving in high gear, it is necessary to fasten the valve 98 in its high speed position, whereby the clutch C—3 is driving the shaft 11. For this purpose, an angular latch arm 140 is pivoted in a housing 141 and is provided with a roller 142 on one of its ends, and a roller 143 on its opposite end. The roller 142 engages the valve 98 through a slot 144 in the sleeve 120. When the valve 98 is advanced to its high speed position, the roller 142 rides into a groove 145 in said valve. This fastens the valve in its advanced position. A coiled spring 146 engages the lever outwardly of its pivot point and is placed under tension by a screw 147, mounted in the housing 141.

A slide 148 is mounted on the housing 121 in a bracket 149 and is provided with a step 150, normally supporting the roller 143, whereby the roller 142 is held out of the groove 145, against the tension of the spring 146. An operating rod or stiff wire 151 is attached to the slide so that the same may be moved longitudinally of the housing. A second step is formed by a set screw 152, and when the slide is moved rearwardly so that the roller 143 drops upon the end of the screw 152, the spring 146 may then exert its pressure to move the roller 142 into the groove 145. By adjusting the screw 152, the depth to which the roller 142 engages in the groove 145 may be regulated. The deeper the roller 142 drops into the groove, the more resistance is offered to the governors G in displacing the valve from this position, and therefore the lower the motor may be throttled down in high speed. It is pointed out that the manual control plunger 136 may be used at any time to dislodge the roller 142 and shift the valve 98.

Gear shifting assembly

The shifting of the splined gear 24 is manually controlled. The hub of the gear 24 is provided with a groove 160 for receiving a yoke 161 which is fastened on a plunger 162 as is best shown in Figures 7, 9, 10 and 13. A cylinder 163 is mounted in the section A on the rear wall thereof. A piston head 164 attached to said plun is slidable in this cylinder and through case walls. A valve case 165 is mounted on the front end of said cylinder and has communication with the front end of the cylinder through a port 166 as is best shown in Figure 13. A double plug valve 168 is mounted in the case, and has reduced portions 169 and 170. The portion 169 is in constant communication with an inlet line 171, while the portion 170 is in constant communication with an exhaust port 172. In Figure 13, the valve is shown shifted so as to supply the oil to the rear of the cylinder by way of the duct 167 while communication is established between the port 166 and the exhaust port 172.

The valve 168 is fastened to one end of an actuating wire 174, mounted in a conduit 175, fastened in the cylinder. This wire is attached to a suitable hand control (not shown), but which may be located on the dashboard or at any suitable point on the vehicle. In the position shown in full lines in Figure 13, the gear 24 will mesh with the pinion 26 and the pinion 23. The parts will remain in this position during the forward propelling of the vehicle, and need not be changed unless it is desired to drive the vehicle in a reverse direction.

Reversing assembly

When it is desired to reverse the transmission, the parts are shifted to the position shown in dotted lines in Figure 13, by pulling the wire 174 to shift the valve 168, whereby the port 166 is connected with the inlet 171 and the duct 167 is opened to exhaust the fluid in the cylinder. By this shifting of the valve 168 the piston 164 is driven to the rear end of the cylinder 163, and the yoke 161 is shifted to slide the gear 24 out of mesh with the heads 23 and pinion 26 and into mesh with a pinion 176 integral with the rear end of the sleeve 26. At the same time the gear 24 is slid into mesh with a counter pinion 177, (Figure 11) whereby the rotation of shaft 12 is reversed. It is obvious that the piston 164 is held in one of its two positions, and the gear 24 is never in a neutral position.

The operation

With the parts as shown in the drawings, the operator or driver depresses the foot pedal 77 whereby the valve 75 is slid forwardly (Figure 14) to establish communication from the pipe 79 which is connected with the oil pump, to the pipe 81 which is connected with the port 109 as is shown in Figure 15. The engine (not shown) having been started is idling and the clutch housing 30 (Figures 1, 2 and 4–8 inclusive) will be revolved, whereby the gear 125 (Figures 1 and 7) will be revolved. The gear 125 revolves the pinion 112 (Figures 7 and 14). The idling speed has no effect on the governors, and they remain in their retracted positions. As the pedal is further depressed the motor is speeded up and the governors G are actuated to slide the valve 98 forwardly in the bushing 97.

As the governors G swing outwardly and pull the piston valve 98 forwardly, the reduced portion 110 of the valve establishes communication between the port 109 and the duct 111, whereby oil from the pipe 81 may flow to the groove 100 (Figure 14). The oil is conveyed from the groove 100 through the duct 99 and a port 101 to the groove 91 in the bushing 88. From the groove 91 the oil enters the ducts 50 through the ports 90 and flows to the chamber 41 of the low gear clutch C—1. The oil being under pressure moves the piston 42 into contact with the clutch ring 43, (Figures 2 and 4). This forces the clutch ring 45 into engagement with a housing ring 33, whereby rotation is contributed to the spider 44. The spider 44 rotates the sleeve 21, whereby the gear train B—1 (Figures 1 and 3) is set in motion.

When the pinion 60 of the gear train B—1 is revolved, it revolves the gear 62. This gear is revolved so that the roller 71 picks up the sleeve 26 and rotates the same. The sleeve 26 through its pinion 26' (Figures 3 and 10) revolves the gear 24 whereby motion is transmitted to the tail shaft 12. The tail or driven shaft 12 is thus directly driven by the low gear assembly. It is obvious that there will be a certain amount of slippage between the rings 43 and 45 of the clutch C—1 and their co-acting parts, and this slippage will permit a partial transmission of motion, but at a reduced ratio. As the slippage decreases, the transmission ratio will increase.

As the speed of the motor and the speed of the vehicle build up the governors G will be further extended and the valve 98 (Figures 14 and 15) will be slid further into the bushing 97. This will gradually bring the reduced portion 110 of the valve into communication with the port 105, but it will be noticed that the port 105 is uncovered before the duct is fully uncovered. When the port 105 is uncovered, oil will flow through the groove 104, through passage 102, through port 103, to the groove 92. From the groove 92 the oil will flow through the port 94 into the ducts 55 and then to the chamber 41 of the clutch C—2, which will be operated. The clutch C—2 drives the sleeve 22 which in turn drives the gear assembly B—2. This may be called the intermediate or second gear, and includes a gear 66 and the pinion 67, which through an overrunning connection drives the counter sleeve 26, which as before described, is already driving the gear 24 of the driven shaft 12.

When the gear train B—2 is operated it will revolve the sleeve 26 at a higher rate of speed than the low gear train and consequently the gear 62 will become an overrunning gear, permitting said sleeve to revolve at a faster rate of speed. There will be a certain amount of slippage in the overrunning connections as well as in the clutches C—1 and C—2. Also the full oil pressure will not be supplied to the clutch C—1 until the clutch C—2 has started operating. From this it will be obvious that innumerable transmission ratios will be established, and practically any load imposed upon the shaft 12 will be properly handled by the transmission.

When the engine reaches its high speed or approaches it, the valve 98 (Figure 14) will be moved forwardly to uncover the port 108, whereby oil will flow through the duct 106, port 107 to the groove 93. From the groove 93 oil will flow through the ports 95 to the ducts 56, whereby the clutch C—3 will be operated and the drive shaft 11 will be directly driven. The full supply of oil will not be delivered to the clutch C—3 until the port 108 is fully uncovered and therefore provision is made for slippage of the clutch and variable speed transmissions. The overrunning transmission gears permit the gear 23 on the rear end of the drive shaft 11 to directly drive the gear 24, whereby motion is contributed to the shaft 12. When the engine is operating in direct drive or high gear, the release of the pedal 77 will decelerate the engine to idling speed and will also slide the valve 75 rearwardly to close communication between the ports 80 and 82 and establish communication between the ports 82 and 84, whereby the fluid is released from the clutches C—1, C—2 and C—3. Thus, when the pedal is released, the engine is operated at idling speed and all the clutches are disengaged, whereby free wheeling of the transmission is provided.

When it is desired to reverse the transmission, the operator merely has to actuate the wire 174 (Figure 13) to shift the valve 168, whereby the piston 164 is moved rearwardly in the cylinder 163 as is shown in dotted lines in Figure 13. This causes the plunger rod 162 to shift the yoke (Figures 1, 10 and 13), whereby the gear 24 is slid out of mesh with the heads 23 and pinion 26'. The gear 24 is thus shifted into mesh with a counter pinion 177 which meshes with a pinion 176 on the rear end of the counter sleeve 26 (Figures 1, 11 and 13). By this shifting of the transmission gears the shaft 12 may be driven in a reverse direction by either the low gear or the intermediate gear.

If the transmission is operated in high gear or in second gear and if it is desired to manually shift it to a lower gear, the operator merely has to pull on the plunger 136 to operate the cap 131 (Figure 14) whereby the valve 98 will be retracted and the proper clutch actuated according to which notch 137 the dog 138, is engaged with. When it is desired to fasten the valve 98 in its high gear position, whereby the clutch C—3 is operated, the operator pulls the wire 151 rearwardly (Figure 14). This moves the slide 148 so that the roller 143 drops down upon the screw 152 which permits the spring 146 to force the roller 142 into the groove 145. This arrangement is desirable where one wishes to drive slowly in high gear, as in traffic. The valve may be released by moving the slide 148 forwardly to swing the lever 140 and withdraw the roller 142 from the groove 145.

The manual control and the setting whereby the transmission may be held in high gear even though the engine is throttled down to a slow speed make for the success of the apparatus.

By observing Figure 14 it will be seen that when the roller 143 rests upon the step 150 the roller 142 is held out of the groove 145 and the governors G are free to slide the valve 98 without interference from the high speed lock. However, when the slide 148 is moved to permit the roller 143 to drop down upon the screw 152, the roller 142 will engage in the groove 145 and hold the clutch in high gear. The degree to which this will be done will depend upon the tension of the spring 146 and the adjustment of the screw 152. These parts may be set so that the valve 98 will be held in its high speed position only during a slight reduction in speed; however, should the slide 148 be pulled back far enough that the roller 143 will not be supported, then the entire tension of the spring 146 would be exerted and its roller 142 would be held in the groove 145 until the speed was reduced to idling speed or slightly below.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What we claim and desire to secure by Letters Patent is:

1. A transmission comprising, transmission gears, a plurality of hydraulic clutches connected with said gears, a driven shaft adapted to be connected with said gears and said clutches, a valve controlling the flow of hydraulic fluids to each clutch, a speed responsive governor operatively connected with said valve controlling the actuation of said clutches, and manually operated means for shifting said valve to limit the operation of the clutches to predetermined speed ratios.

2. A transmission comprising, transmission gears, a plurality of hydraulic clutches connected with said gears, a driven shaft connected with said gears and said clutches, a valve controlling the flow of hydraulic fluids to each clutch, a speed governor operatively connected with said valve controlling the actuation of said clutches, and manually actuated means for locking the valve in position to maintain the high speed clutch in operation.

3. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, means for supplying fluid under pressure, speed responsive means for directing the supply of pressure fluid to said hydraulic means to actuate one or more of said clutches at the same time and in sequence, whereby a continuous transmission of power uninterrupted by speed variations is set up, and manually operated means adapted to restrain the speed responsive means against speed responsive actuation during a predetermined speed range, whereby a selected transmission ratio may be maintained during said range.

4. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, means for supplying fluid under pressure, speed responsive means for directing the supply of pressure fluid to said hydraulic means to actuate one or more of said clutches at the same time and in sequence, whereby a continuous transmission of power uninterrupted by speed variations is set up, and manually operated means for holding said speed responsive means in a fixed position during a predetermined speed range and releasing said means for speed responsive actuation during other speed ranges.

5. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, speed responsive means for directing the supply of pressure fluid to said hydraulic means to actuate one or more of said clutches at the same time and in sequence, whereby a continuous transmission of power uninterrupted by speed variations is set up, and manually operated means for moving the speed responsive means to set up a predetermined gear ratio, whereby said speed responsive means is free to move to another gear-ratio position.

6. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, means for supplying fluid under pressure, a valve having speed responsive actuating means and acting to direct the supply of pressure fluid to said hydraulic means to actuate one or more of said clutches at the same time and in sequence, whereby a continuous transmission of power uninterrupted by speed variations is set up, and manually operated means adapted to restrain the valve against speed responsive actuation during a predetermined speed range, whereby a predetermined transmission ratio may be maintained during said range.

7. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, means for supplying fluid under pressure, a valve having speed responsive actuating means and acting to direct the supply of pressure fluid to said hydraulic means to actuate one or more of said clutches at the same time and in sequence, whereby a continuous transmission of power uninterrupted by speed variations is set up, and manually operated means for holding said valve in a fixed position during a predetermined speed range and releasing said valve for speed responsive actuations during other speed ranges.

8. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, means for supplying fluid under pressure, a valve having speed responsive actuating means and acting to direct the supply of pressure fluid to said hydraulic means to actuate one or more of said clutches at the same time and in sequence, whereby a continuous transmission of power uninterrupted by speed variations is set up, and manually operated means for moving the valve to set up a predetermined gear ratio, whereby said speed responsive means is free to move said valve to another gear-ratio position.

9. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, means controlling the actuation of said hydraulic means, a speed responsive device actuating said controlling means and thereby setting up sequent transmission ratios without fixed differentials, and manually operated means adapted to restrain the speed responsive means against speed responsive actuation during a predetermined speed range, whereby a selected transmission ratio may be maintained during said range.

10. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, means controlling the actuation of said hydraulic means, a speed responsive device actuating said controlling means and thereby setting up sequent transmission ratios without fixed differentials, and manually operated means for holding said speed responsive means in a fixed position during a predetermined speed range and releasing said means for speed responsive actuation during other speed ranges.

11. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, means controlling the actuation of said hydraulic means, a speed responsive device actuating said controlling means and thereby setting up sequent transmission ratios without fixed differentials, and manually operated means for moving the speed responsive means to set up a predetermined gear ratio, whereby said speed responsive means is free to move to another gear-ratio position.

12. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, a valve controlling the actuation of said hydraulic means, a speed responsive device actuating said controlling means and thereby setting up sequent transmission ratios without fixed differentials, and manually operated means adapted to restrain the valve against speed responsive actuation during a predetermined speed range, whereby a predetermined transmission ratio may be maintained during said range.

13. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, a valve controlling the actuation of said hydraulic means, a speed responsive device actuating said controlling means and thereby setting up sequent transmission ratios without fixed differentials, and manually operated means for holding said valve in a fixed position during a predetermined speed range and releasing said valve for speed responsive actuation during other speed ranges.

14. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, a valve controlling the actuation of said hydraulic means, a speed responsive device actuating said sontrolling means and thereby setting up sequent transmission ratios without fixed differentials, and manually operated means for moving the valve to set up a predetermined gear ratio, whereby said speed responsive means is free to move said valve to another gear-ratio position.

15. An automatic transmission comprising, a plurality of clutches, transmitting members adapted to be connected with a part of each clutch, means adapted to drive said clutches, hydraulic means for actuating one or more of said clutches at the same time, a pressure fluid supply conductor, pressure fluid distributing conductors connected with said hydraulic means for supplying pressure fluid thereto, a movable valve controlling the passage of pressure fluid from the supply conductor to individual distributing conductors to actuate one or more of the clutches at the same time, a speed responsive governor connected with said valve and operating the same, and manually operated means adapted to move said valve independently of said governor actuation to establish communication between the supply conductor and manually selected distributing conductors.

16. An automatic transmission comprising, a plurality of clutches, transmitting members adapted to be connected with a part of each clutch, means adapted to drive said clutches, hydraulic means for actuating one or more of said clutches at the same time, a pressure fluid supply conductor, pressure fluid distributing conductors connected with said hydraulic means for supplying pressure fluid thereto, a movable valve controlling the passage of pressure fluid from the supply conductor to individual distributing conductors to actuate one or more of the clutches at the same time, a speed responsive governor connected with said valve and operating the same, and means adapted to hold said valve in an adjusted position to maintain a predetermined transmission ratio in opposition to speed responsive actuation by said governor.

17. An automatic transmission comprising, a plurality of clutches, transmitting members adapted to be connected with a part of each clutch, means adapted to drive said clutches, hydraulic means for actuating one or more of said clutches at the same time, a pressure fluid supply conductor, pressure fluid distributing conductors connected with said hydraulic means for supplying pressure fluid thereto, a movable valve controlling the passage of pressure fluid from the supply conductor to individual distributing conductors to actuate one or more of the clutches at the same time, a speed responsive governor connected with said valve and operating the same, means adapted to hold said valve in an adjusted position to maintain a predetermined transmission ratio in opposition to speed responsive actuation by said governor, and means for adjusting the holding means to vary the resistance offered to the actuation of the valve by the governor.

18. In an automatic transmission, a plurality of clutches, transmission members connected with and driven by said clutches, means adapted to drive said clutches, hydraulically actuated means connected with said clutches for operating the same, a slide valve controlling the passage of pressure fluid to said actuating means, said valve having a portion provided with a recess, a speed responsive governor sliding said valve, a pivoted locking element having one end engaging in the recess of the said valve portion to hold the valve against actuation by said governor, a support sustaining said locking element, and means for manually adjusting said support.

19. An automatic transmission comprising, a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches at the same time and in sequence, means for supplying fluid under pressure, means controlling the actuation of said hydraulic means, a speed responsive device actuating said controlling means and thereby setting up sequent transmission ratios without fixed differentials, and manually operated means adapted to maintain the supply of pressure fluid to the clutch of highest transmission ratio irrespective of speed variations.

ROY E. MILLICAN.
WORD R. MILLICAN.